June 28, 1927.

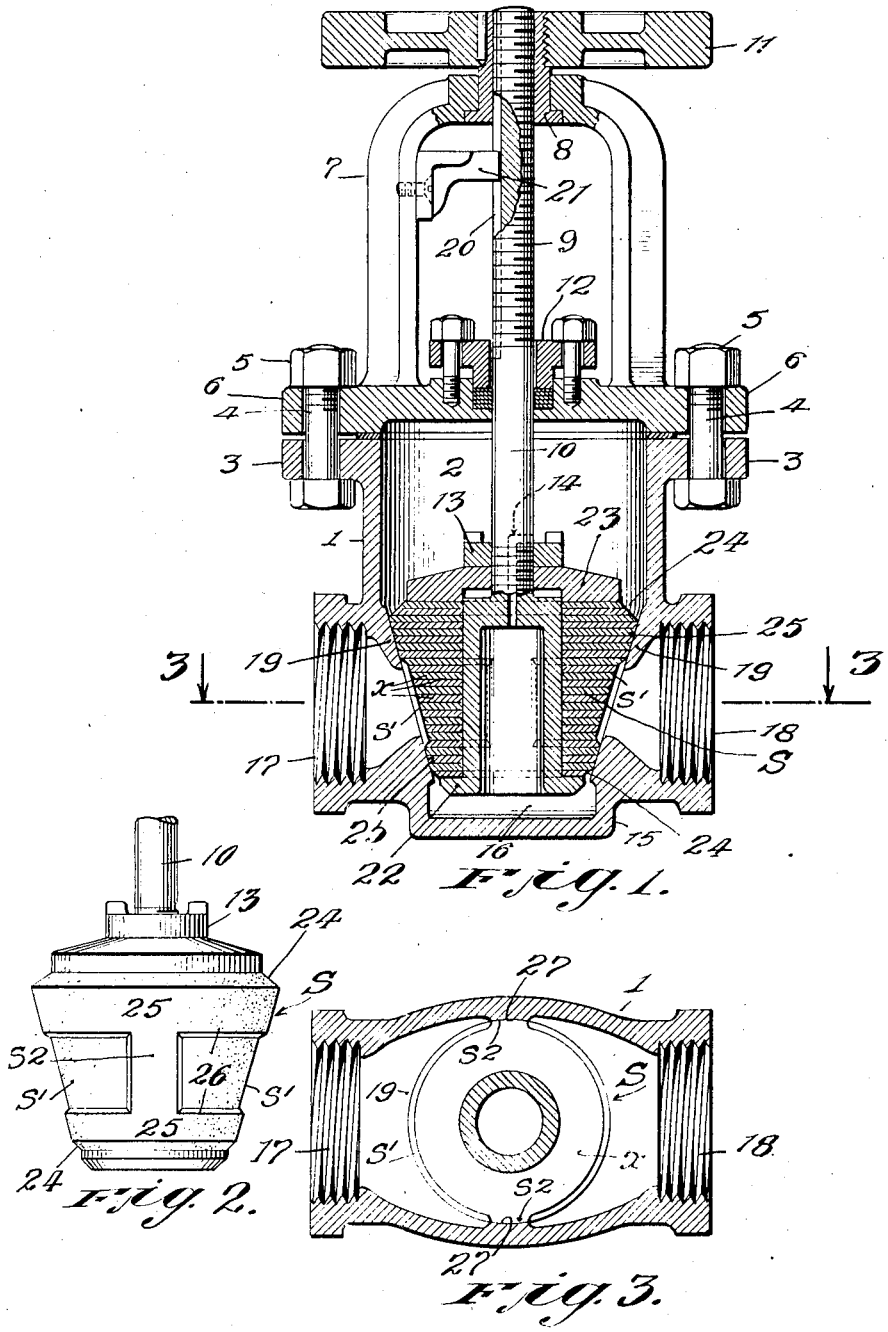

W. G. WILSON

NONREVOLUBLE VALVE

Filed Jan. 6, 1926

1,633,690

2 Sheets-Sheet 2

INVENTOR

ATTORNEY

Patented June 28, 1927.

1,633,690

UNITED STATES PATENT OFFICE.

WYLIE GEMMEL WILSON, OF ELIZABETH, NEW JERSEY, ASSIGNOR TO LOOSE SEAT VALVE COMPANY, OF DOVER, DELAWARE, A CORPORATION OF DELAWARE.

NONREVOLUBLE VALVE.

Application filed January 6, 1926. Serial No. 79,576.

This invention relates to non-revoluble valves. Its object is to produce a valve of the class indicated better adapted than heretofore for effecting and maintaining a nonleaking condition. The present invention pertains particularly to the complementary sealing members.

In the accompanying drawings forming a part hereof and illustrating the invention, Figs. 1, 2 and 3 show one form of the invention, Fig. 1 being a vertical central section thereof; Fig. 2 an elevation of the movable sealing member removed; and Fig. 3 a transverse section at line 3—3 of Fig. 1 looking down.

Figure 4:
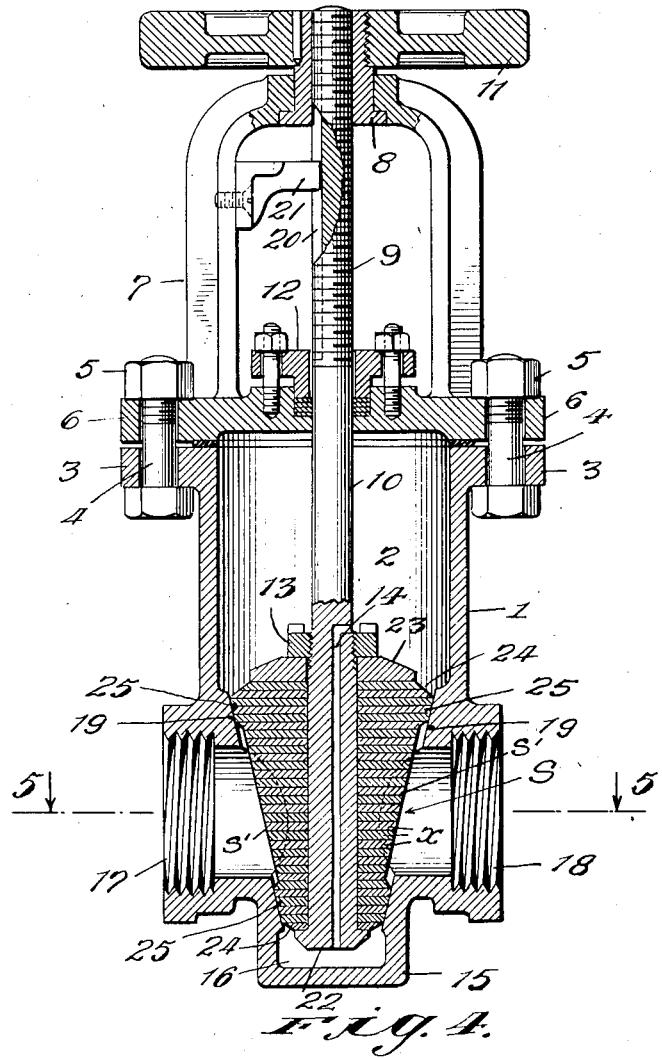
Figure 5:
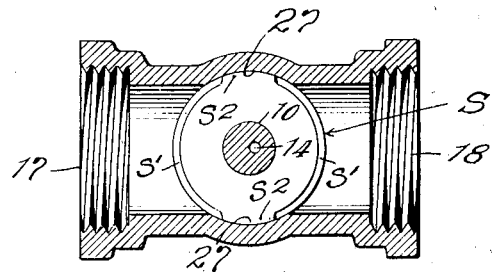

Figs. 4 and 5 show another form of the invention, Fig. 4 being a vertical central section and Fig. 5 a transverse section at line 5—5 of Fig. 4 looking down.

In the drawings, 1 is a casing provided with an upper chamber 2 for reception of the gate when lifted. Casing 1 has a flange 3 through which bolts 4 provided with nuts 5 pass through a margin of the top bracket plate 6. The bracket has an upwardly extending member 7 provided at its top with a threaded thimble 8 through which the upper threaded portion 9 of the gate stem 10 extends. The upper end of the stem is provided with a handle 11 fixed to the thimble in the usual manner; the valve stem passing through a gland 12 carried by the top bracket plate and through said plate. The under end of the spindle is provided with a nut 13. Spindle 10 has at its under portion a lengthwise extending passageway 14 which is open at the bottom and extends upwardly through the spindle and opens into chamber 2. The under end of the casing is provided with a wall 15 having a chamber 16 for reception of the under end of the spindle, below the transversely opposed ports 17 and 18, one of which may be the intake port and the other of which may be the outlet port. Each port is surrounded by a downwardly tapering, arced port sealing wall 19. The upper portion of the spindle is provided with a lengthwise extending slot 20 for reception of a lug 21 carried by the bracket 7, whereby the spindle is given a rectilinear movement only. The under end of the spindle is provided with a flange 22 supporting the sealing plug S which is clamped in place by the collar 23 and nut 13. The tapered plug S, Fig. 2, is round in transverse cross-section, has upper and under ends, but between its ends has two arcuate recesses $s'$, one of which is opposable to one port and the other of which is opposable to the other port. Each recess $s'$ extends partway around the plug. The two recesses are spaced apart and separated one from the other by ribs $s^2$ which have the same taper as the upper and under ends of the plug.

The sealing ring or plug is preferably but not necessarily made up of precompressed, superposed and united disks of asbestos or the like. The upper and under peripheral corners of the tapered plug are bevelled off at 24 forming two circumferentially extending sealing surfaces 25 that extend wholly around the plug, each sealing surface being between a peripheral bevel 24 and an inner bevel of the long, horizontal walls 26 of each recess $s'$. The ribs $s^2$ contact, when the sealing plug is seated, with interior, arcuate walls 27 of the casing, which walls 27 are vertical portions of wall 19. The latter walls are diametrically opposed as are the vertical ribs $s^2$ of the sealing plug.

The laminæ out of which the preferred form of sealing plug is made are indicated by $x$. The sealing face 25 and the ribs $s^2$ which also form sealing surfaces, are formed by the edges of the laminæ when they form contacts with the supplementary sealing or valve seat walls 19 of the casing. The sealing faces 25 of the plug project beyond the recess $s'$. The bevelled laminæ at 24 and at 26 give support to the sealing edges of the intermediate laminæ in the faces 25 and $s^2$.

While the tapered laminæ edges perform no direct function in sealing, they definitely serve as supports one for the other and for the intermediate laminæ and also serve as spacers to hold the sealing surfaces apart from mechanical means clampably engaging the clampable ends of the plug. That is by screwing down the collar 23 and setting up the nut 13, the already preferably precompressed and united laminæ, which possess but slight elasticity, are further compressed against the supporting flange 22 of the spindle.

The passageway 14 is a relief passageway which is sometimes present and sometimes absent in valves in the present class. When present, it provides for the automatic escape of compressed fluids from the space at the foot of the valve plug upwardly into the chamber above the valve plug. Each recess S' extending partway around the plug has a dimension, in the direction of the movement of the plug, greater than the dimension of the port in the same direction. When the valve is closed, the sealing surfaces 25 that extend wholly around the plug, one above and the other below the recesses S', operate as sealing surfaces and prevent fluid then entering at either port and so entering into a recess S' from passing to the port opposite the port receiving the fluid. The moment the valve plug is lifted from its seated position, the sealing surfaces 25 and $S^2$ bcome ineffective as sealing surfaces and the valve is open from one port to the other.

What I claim is:

1. A conical sealing member of dense, slightly compressible material; means for reciprocating said member; a cooperating, conical sealing wall provided with ports; the sealing member having, opposable to each port, a recess longer in the direction of the movement of the sealing member than the corresponding dimension of the immediately opposable port, the recesses being spaced apart and each wholly enclosed by a sealing face contactible with the conical sealing wall around the ports.

2. In a valve, the combination with a valve casing provided with a plurality of ports each opening into a conical wall around the ports; a spindle adapted to carry a conical sealing member; means for reciprocating the spindle, and means to prevent rotation of the spindle, of a conical sealing member of dense, slightly compressible material, the sealing member being fixed to the spindle and having, opposable to each port, a recess longer in the direction of the movement of the sealing member than the corresponding dimension of the immediately opposable port, the recesses being spaced apart and each wholly enclosed by a sealing face contactible with the conical sealing wall around the ports.

Signed at New York in the county of New York and State of New York this 23rd day of December, A. D. 1925.

WYLIE GEMMEL WILSON.